Feb. 23, 1932.  H. B. GREENING ET AL  1,846,031
INTERNAL COMBUSTION ENGINE OF THE TWO-STROKE CYCLE TYPE
Filed Jan. 17, 1931
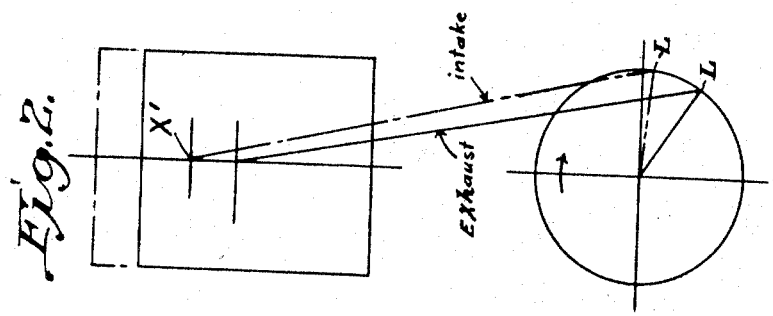
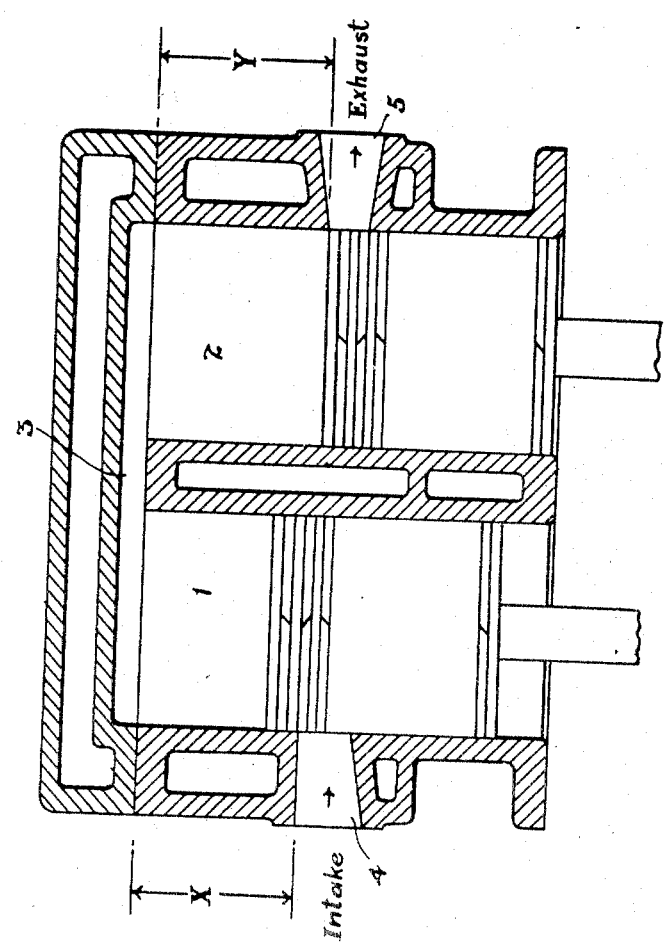
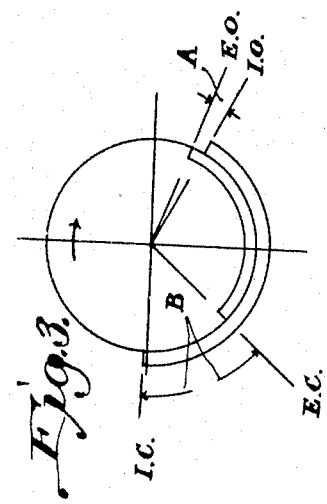
Inventors.
Herald B. Greening.
James W. Galloway.

Patented Feb. 23, 1932

1,846,031

UNITED STATES PATENT OFFICE

HERALD B. GREENING AND JAMES W. GALLOWAY, OF HAMILTON, ONTARIO, CANADA, ASSIGNORS TO GALLOWAY ENGINEERING COMPANY LIMITED, OF HAMILTON, ONTARIO, CANADA

INTERNAL COMBUSTION ENGINE OF THE TWO-STROKE CYCLE TYPE

Application filed January 17, 1931. Serial No. 509,326.

The principal objects of this invention are, to enhance the operative value of internal combustion engines of the two stroke cycle type and particularly to obtain the maximum efficiency in an engine of the dual cylinder form provided with a common combustion head.

The principal feature of the invention consists in the novel arrangement of the intake port in one of the pair of cylinders in relation to the exhaust port in the other, whereby the intake port is opened slightly later than the exhaust port and remains open for a period considerably greater than the exhaust port, whereby the maximum volume of combustible gas is placed within the cylinder.

In the accompanying drawings, Figure 1 is a longitudinal mid-sectional view of a dual cylinder structure having a common combustion head and to which this invention has been applied.

Figure 2 is a diagram illustrating the relative movement of the pistons and crank shaft.

Figure 3 is a diagram illustrating the relative value of the port openings.

In the ordinary practice in the construction of engines of the dual cylinder combined combustion head type wherein one piston travels slightly in advance of the other it is found that when the intake and exhaust ports are arranged a corresponding distance from the outer end of the cylinders, or the same distance from the respective bottom dead centres of the crank, the pressure within the cylinder drops to atmosphere or supercharger pressure very rapidly once the exhaust opens.

It has been found that by placing the intake port in such a position that it will open slightly later than the exhaust port the combined effect of the inertia of the exhaust and the scavenging effect of the incoming gases causes the cylinders to be cleared quite rapidly of the exhaust gases. This permits a comparatively early closing of the exhaust port and to obtain the best efficiency it is desirable that the intake should remain open for a considerable period after the exhaust closes so as to obtain the full benefit of the volume of fuel directed thereto by a blower or superchanger and also to obtain the full benefit of the natural effect of flow under atmospheric pressure to the interior of the cylinder following the closing of the exhaust port.

As shown in the accompanying drawings, cylinders 1 and 2 are connected by a common combustion head 3.

The intake port 4 is arranged a shorter distance X from the head end of the cylinder than is the distance Y of the exhaust port 5 from the head end of the cylinder.

As illustrated in the diagram Fig. 3 the point of opening E O of the exhaust is in advance of the point of opening I O of the intake by the angle A and this angle is less than the angle B between the point E C of the closing of the exhaust and the point I C of the closing of the intake.

This occurs when the sum of the distance X of the top of the intake port below the top of the cylinder plus the height of the piston above the wrist pin X' plus the distance from the wrist pin to the crank pin L is less than the corresponding dimensions for the exhaust side, and the angle A is in like proportion less than the angle B.

What we claim as our invention is:—

1. An internal combustion engine in which a pair of cylinders one having the intake port and the other the exhaust port are connected by a common combustion head and the piston of the exhaust cylinder leads the piston of the intake cylinder, said intake port being of a width to maintain an open port until after the exhaust port is closed.

2. An internal combustion engine in which a pair of cylinders are connected by a common combustion head and one cylinder is provided with an intake port and the other with an exhaust port and the pistons are arranged with the one in the exhaust cylinder leading, said ports being so proportioned and arranged that the distance from the head end of the cylinder to the top of the intake port plus the distance from the head end of the piston to the wrist pin center plus the distance from the wrist pin center to the crank pin is less than the distance from the cylinder head to the top of the exhaust port plus the distance from the piston head to the wrist pin center plus the distance from the wrist pin to the crank pin.

3. A dual cylinder two-cycle engine having a common combustion head and the intake port arranged in one cylinder and the exhaust port arranged in the other, pistons operating in said cylinders with the one in the exhaust cylinder leading, the top of the intake port being closer to the cylinder head than the top of the exhaust port and the bottom of said intake port being spaced from the top thereof so that the intake piston cooperates with the intake port to close the intake port a considerable period of time following the closing of the exhaust port by the exhaust piston permitting the entrance of the maximum volume of fuel to the cylinder.

HERALD B. GREENING.
JAMES W. GALLOWAY.